United States Patent [19]

Schneider et al.

[11] 3,845,238

[45] Oct. 29, 1974

[54] PORTABLE TELEVISION CAMERA WITH AUDIO COMMUNICATION

[75] Inventors: Hans-Dieter Schneider, Gross-Gerau; Horst Bachmann, Darmstadt, both of Germany

[73] Assignee: Robert Bosch Fernsehanlagen GmbH, Darmstadt, Germany

[22] Filed: Apr. 5, 1973

[21] Appl. No.: 348,157

[30] Foreign Application Priority Data

Apr. 7, 1972 Germany .......................... 221668

[52] U.S. Cl. ................ 178/5.8 R, 178/7.2, 178/7.9, 178/DIG. 30

[51] Int. Cl. ........................................ H04n 5/26

[58] Field of Search ........... 178/DIG. 30, 5.8 R, 5.6, 178/5.4, 7.9, 7.8, 7.2, DIG. 23

[56] References Cited

UNITED STATES PATENTS 2,475,641 7/1949 Rosenberg .......................... 178/5.6

3,377,427 4/1968 Fisher .............................. 178/7.2

3,532,815 10/1970 Toroic .............................. 178/7.9

3,651,255 3/1972 Kubota et al. ............ 178/DIG. 26

OTHER PUBLICATIONS

Mobile Television Equip. - Campbell et al. - Proceedings of IRE, Jan. 1942, Vol. 30, No. 1, 1942.

*Primary Examiner*—Robert L. Richardson
*Assistant Examiner*—Mitchell Saffian
*Attorney, Agent, or Firm*—Michael S. Striker

[57] ABSTRACT

A portable television camera wherein a first housing carries a picture taking lens and a loudspeaker which is connected to the control center, and a second housing carries a view finder and a microphone for communication with the control center. The two housings are adjustably connected to each other by a hollow coupling which surrounds electrical conductors connecting the microphone and the view finder with parts in the first housing.

14 Claims, 6 Drawing Figures

PORTABLE TELEVISION CAMERA WITH AUDIO COMMUNICATION

BACKGROUND OF THE INVENTION

The present invention relates to television cameras in general, and more particularly to portable television cameras, especially to portable color television cameras.

It is already known to install the optical elements, the camera tubes, the view finder and the deflection coils for the camera tubes in a first housing and to provide a discrete second housing which is connected with the first housing by one or more cables and contains the electronic components of the portable camera. The second housing is carried on the back or is deposited in a designated central area. The transducers which are strapped to the head of the camera operator are connected with the control center (for example, a land mobile station) by means of cables. It is also known to employ an amplifier and a sender for wireless transmission of images to the control center and/or to provide a portable magnetic tape recorder for simultaneous recordal of images.

An advantage of the distribution of component parts of a portable television camera in two discrete housings is that this allows for a substantial reduction in the weight of the first housing which must be manipulated by the operator during picture taking. As mentioned before, the first housing receives and/or supports the picture taking lens, the view finder and the camera tubes. The relatively bulky electronic components and, if needed, the batteries or other suitable current supplying parts, are stored in the second housing which can be carried on the back of the operator. This affords sufficient freedom of movement and is less tiresome during picture taking than if all camera parts were to be mounted on a shoulder harness.

The television camera of each camera chain is normally connected with the main control center or with a land mobile station by means of a microphone and an earphone so that the camera operator is in constant communication with the person or persons in charge. As a rule, the camera operator will communicate with the land mobile station during televising of current events. In manipulating a camera which is mounted on a shoulder harness, the operator attempts to stabilize the camera by holding it not unlike a shotgun or rifle, i.e., the operator will attempt to support the camera by the inner portion of the respective shoulder, to press the camera against the front side of the shoulder and to press the side wall of the housing against one of his cheeks. One hand grips the handle and the other hand remains free to adjust the diaphragm and/or the focal length of the lens during picture taking. Such cameras are normally provided with view finders which are mounted at one side of the housing for the picture taking lens and at such a distance from the nearest wall of the housing that the operator can look into the view finder without being compelled to twist his head or to assume another uncomfortable or unnatural position during picture taking.

The just discussed optimum positioning of a portable television camera cannot be achieved due to the fact that the operator must carry a microphone, an earphone as well as the structure which straps such parts to his head. Thus, a conventional earphone prevents the placing of the housing sufficiently close to the cheek so that the camera is likely to shake during picture taking and the view finder must be mounted at a considerable distance from the housing. Additional problems arise due to the fact that the earphone and the microphone must be connected with the housing by one or more cables. Thus, the operator must disconnect the transducers (which are strapped to his head) from the housing whenever the housing is deposited during an intermission, or the transducer must be detached from his head to be deposited together with the housing. All this necessitates the exertion of additional effort and requires additional manipulations prior as well as subsequent to picture taking.

SUMMARY OF THE INVENTION

An object of the invention is to provide a television camera, especially a portable color television camera, which is easier to carry, easier to manipulate and easier to adjust than heretofore known television cameras.

Another object of the invention is to provide a portable television camera which enables the operator to communicate with the control center without being compelled to strap an earphone and/or microphone to his head.

A further object of the invention is to provide a television camera wherein the position of the view finder relative to the picture taking lens can be adjusted and fixed in a novel and improved way.

An additional object of the invention is to provide a portable television camera wherein the optical, electroacoustic and control elements are distributed in a novel and improved way to insure that the work of the camera operator is less tiresome than the manipulation of a conventional camera.

Still another object of the invention is to provide a television camera wherein the electroacoustic transducers which enable the camera operator to communicate with the control center are mounted and adjustable in such a way that they do not interfere with an optimum positioning of the camera with respect to the operator's body during picture taking.

Another object of the invention is to provide a novel and improved composite housing for a portable television camera.

The invention is embodied in a television camera, particularly in a portable color television camera, which comprises a housing, a picture taking lens mounted on or in the housing, and a pair of electroacoustic transducers for enabling the camera operator to communicate with the control center. One of the transducers (preferably a loudspeaker) is mounted in or on the housing.

The camera preferably further comprises a second housing for the other transducer (preferably a microphone) and for the view finder (which is preferably mounted at a level above the other transducer), and coupling means for separably and/or adjustably connecting the two housings to each other. The coupling means may constitute a sheath for electric conductors which connect the parts in the first mentioned housing with the view finder and the other transducer in the second housing.

The novel features which are considered as characteristic of the invention are set forth in particular in the appended claims. The improved television camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
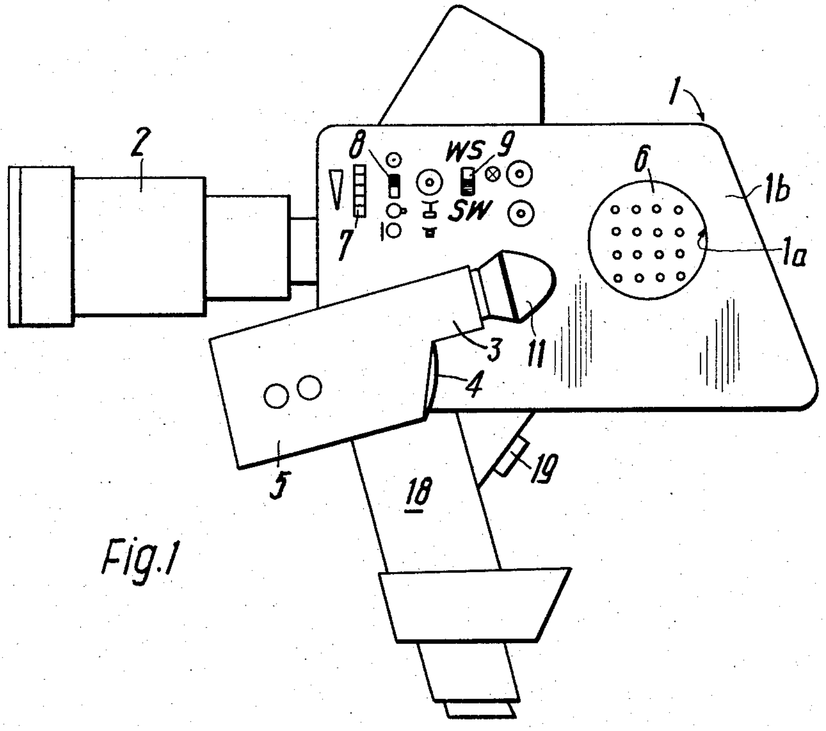
FIG. 1 is a side elevational view of a portable television camera which embodies the invention.

Referring first to FIG. 1, there is shown a portable color television camera which comprises a first or main housing 1 and a second or auxiliary housing 5. The first housing 1 supports a detachable picture taking lens 2 and contains the color splitting optics and camera tubes with associated deflection coils. A view finder 3 is mounted on the second housing 5 at a level above a microphone 4 which constitutes one of the two electro-acoustic transducers serving to enable the camera operator to communicate with the control center. The other electro-acoustic transducer is a loudspeaker 6 which is mounted in the housing 1 behind an opening 1*a* provided in that side wall (1*b*) of the housing which is nearer to the housing 5.

Figure 6:
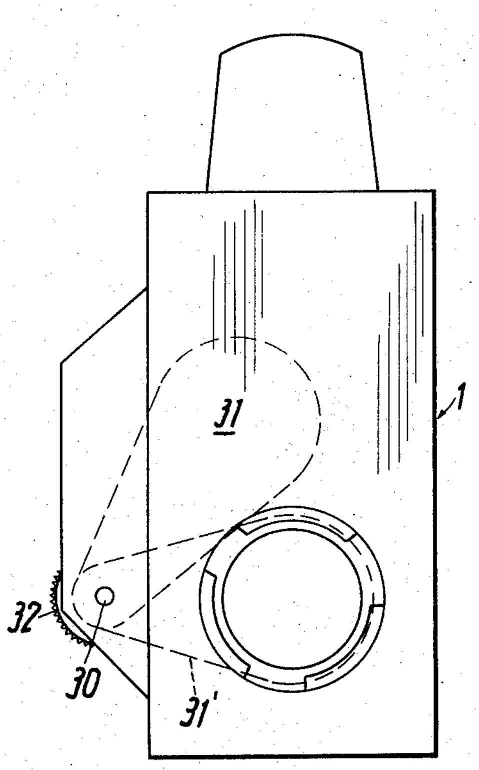
FIG. 6 is a front elevational view of the housing for the picture taking lens, with the lens mount removed.

The side wall 1*b* of the main housing 1 carries a number of control elements which can be actuated by the operator during picture taking. These control elements include a sound amplitude regulator 7, a microphone switch 8, a selector 9 for black or white level adjustment, and a pushbutton 10 for carrying out the selected level adjustment while the camera is trained upon a white reference surface or while an opaque (black) plate or disk 31 (FIG. 6) extends across the path of incoming light. The control means for black and white level adjustment further includes a sheet metal disk 31 which is shown in FIG. 6.

Prior to carrying out a white level adjustment, the operator shifts the selector 9 to the corresponding position (WS in FIG. 1) and the knob 10 is thereupon depressed to effect the desired level adjustment. Prior to carrying out a black level adjustment, the operator rotates a serrated knob 32 which is connected with the sheet metal disk 31 so as to move the disk to the position 31′ of FIG. 6. The disk 31 then extends across the path of incoming light. In the next step, the operator moves the selector 9 to the position SW (FIG. 1) and thereupon depresses the knob 10 to effect the black level adjustment. The disk 31 is mounted on a shaft 30 which is parallel to the optical axis of the lens 2 (not shown in FIG. 6). In order to avoid reflection, the disk 31 is lacquered to a dull black finish. When the disk 31 assumes the position 31′ of FIG. 6, it is located between the lens 2 and the camera tubes to allow for black level adjustment without any illumination of camera tubes.

Figure 2:
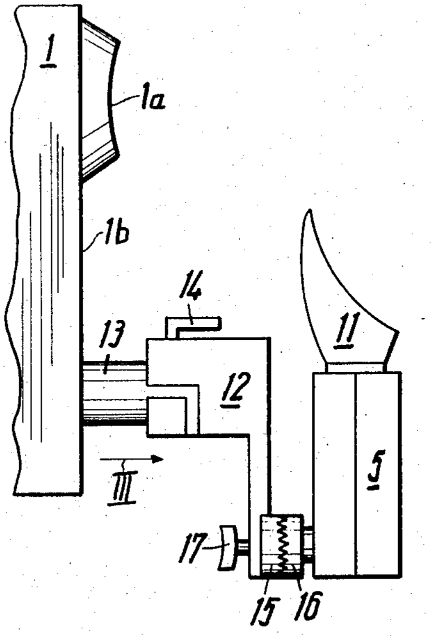
FIG. 2 is a fragmentary plan view of the television camera shown in FIG. 1.

FIG. 2 shows the second housing 5 and the coupling means which serves to separably and adjustably connect the housing 5 to the main housing 1. The housing 5 is provided with an eye cup 11 through which the operator can observe the scene or subject in the view finder 3 while having one of his ears adjacent to the opening 1a for the loudspeaker 6.

Figures 3, 4:
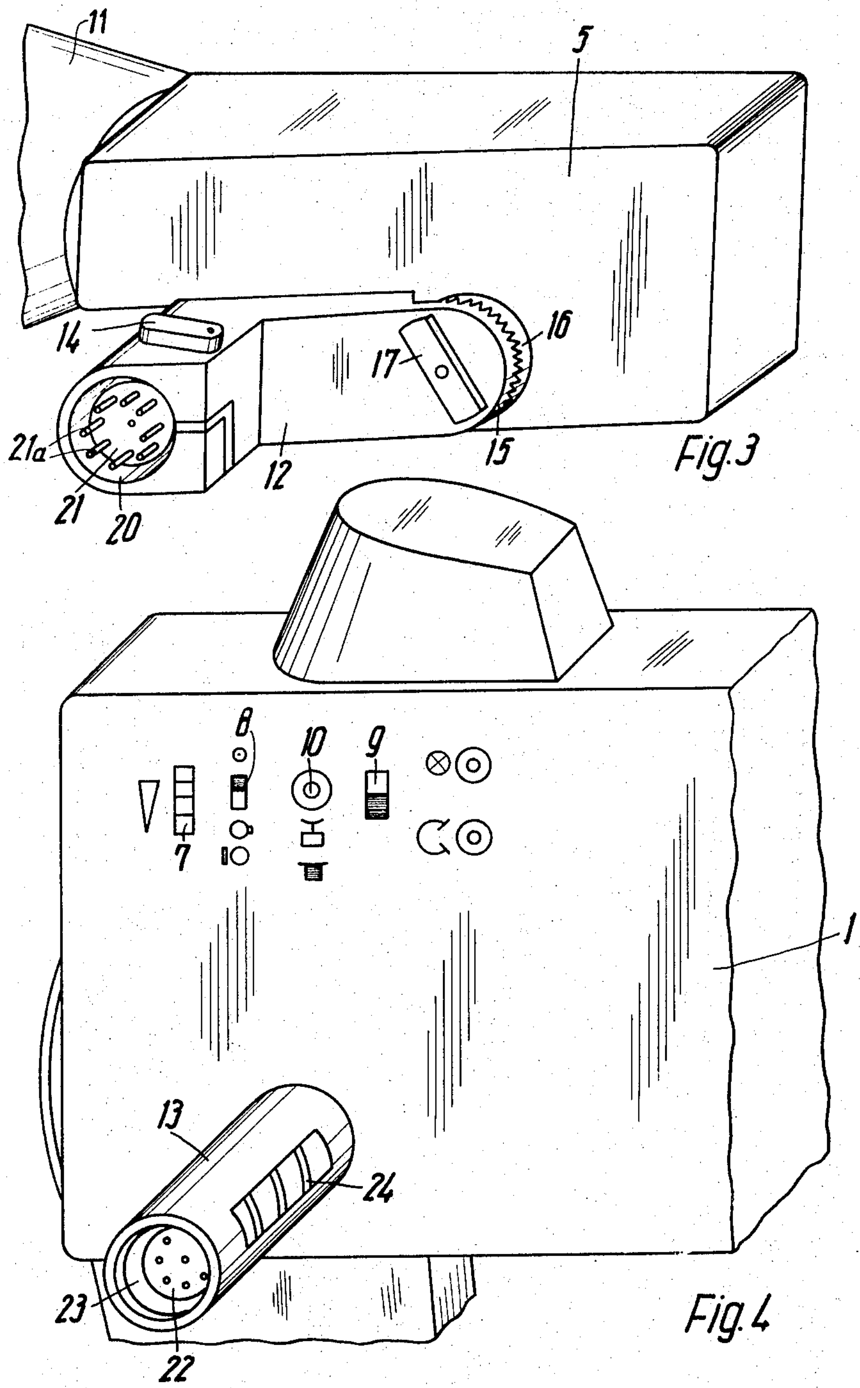
FIG. 3 is an enlarged perspective view of the second housing substantially as seen in the direction of arrow III shown in FIG. 2.
FIG. 4 is an enlarged fragmentary perspective view of the housing for the picture taking lens.
Figure 5:
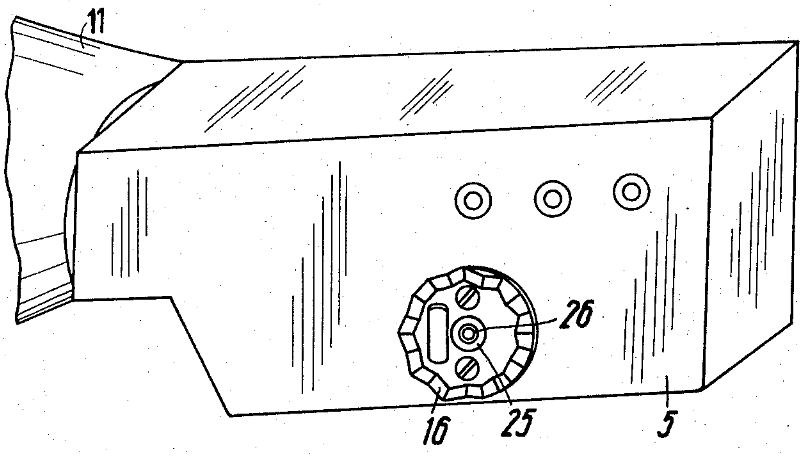
FIG. 5 is a perspective view similar to that of FIG. 3 but with a portion of the coupling means removed.

The coupling means between the housings 1 and 5 comprises a hollow crank arm 12 one end portion of which forms a cylinder and is telescoped onto a sleeve-like extension 13 of the housing 1. A screw 14 or an analogous fastener is provided to separably secure the crank arm 12 to the extension 13 at a selected distance from the housing wall 1*b*. As shown in FIGS. 2, 4 and 5, the other end portion of the crank arm 12 is rigid with a detent disk 15 having a serrated face provided with radially extending teeth which mate with complementary teeth on a second detent disk 16 secured to the auxiliary housing 5. The disks 15, 16 are held in engagement (see FIGS. 2 and 3) by a screw or an analogous connector 17 which can be actuated to allow for at least partial separation of the crank arm 12 from the housing 5 so that the disk 15 can be rotated relative to the disk 16 or vice versa in order to change the orientation of the housing 5 relative to the housing 1.

The cylindrical end portion of the crank arm 12 has an axial bore 20 (FIG. 3) which receives a plug 21 with several terminals 21*a*. The sleeve 13 of the main housing 1 contains a tubular receptacle 23 for a socket 22 which has holes for reception of terminals 21*a* when the cylindrical end portion of the crank arm 12 is slipped onto the sleeve 13. The receptacle 23 has limited freedom of axial movement in the sleeve 13 and is biased outwardly by a helical spring 24 so that it normally abuts against a shoulder or an analogous stop in the sleeve 13. The distance between the housings 1 and 5 depends on the extent to which the sleeve 13 is received in the cylindrical end portion of the crank arm 12 whereby the spring 24 insures that the socket 22 is properly connected with the plug 21 in each axial position of the sleeve 13 relative to the cylindrical end portion of the crank arm. The socket 22 and plug 21 respectively constitute female and male portions of electrical conductor means between the view finder 3 and microphone 4 in the housing 5 on the one hand and the parts in the housing 1 on the other hand.

FIG. 5 shows that the detent disk 16 of the housing 5 surrounds an axially movable nut 25 having internal threads 26 which mate with external threads on the connector 17. The nut 25 is biased into the housing 5 by a spring (not shown) which is stressed when the connector 17 (which cannot move axially relative to the crank arm 12) is rotated to penetrate deeper into the nut 25. The detent disk 15 then mates with the detent disk 16 and the crank arm 12 cannot change its angular position with respect to the housing 5, or vice versa. When the connector 17 is rotated in a direction to allow the nut 25 to move away from the disk 15, the bias of the spring for the nut 25 decreases and the operator can turn the disks 15, 16 relative to each other to change the angular position of the housing 5 relative to the common axis of the disks 15, 16.

Referring again to FIG. 1, the main housing 1 is provided with a downwardly extending handle 18 with a start-stop button 19 for a magnetic tape recorder (not shown) which can be carried along by the operator or by an assistant.

The adjustability of the housing 5 toward and away from the wall 1*b*, coupled with the possibility of rotating the housing 5 about the common axis of the disks 15, 16, enables the operator to place the eye cup 11 and the microphone 4 in an optimum position relative to the housing 1. The operator can select the distance between the loudspeaker 6 and the microphone 4 by moving the cylindrical end portion of the crank arm 12 nearer to or further away from the wall 1*b* and/or by turning the housing 5 about the common axis of the disks 15, 16. The level of the eyecup 11 can be changed by turning the housing 5 about the axis of the disks 15, 16 so that the eye which observes the image in the view finder 3 and the ear which hears the messages transmitted via loudspeaker 6 are in optimum positions relative to the housings 5 and 1 when the camera is in use. Moreover, by changing the position of the housing 5 relative to the housing 1, the operator insures a desirable distribution of masses so that the holding of the camera during picture taking is less tiresome. Since the microphone 4 is mounted below the eyecup 11, it is in an optimum position relative to the mouth of the operator when an eye observes the image in the view finder 3.

Another advantage of the improved camera is that the transducers for communication with the control center need not be mounted on the head of the operator. Also, the electrical connection between the housings 1 and 5 is terminated in automatic response to termination of the mechanical connection (by detaching the crank arm 12 from the sleeve 13 or from the disk 16).

In presently known television cameras, the adjustment of beam current to 100 percent during scanning of a white surface (i.e., the aforediscussed white level adjustment) is necessary whenever the illumination of the scene changes. The black level adjustment is less frequent but it must be carried out at certain intervals in order to insure the making of satisfactory exposures. This enables the operator to determine the intensity of signal when the housing 1 is sealed against entry of light by way of the objective. If a television camera is permanently connected with the control center, the white and/or black level adjustment is carried out in the control center with the help of an oscilloscope or oscillograph. In a portable television camera which is operated by batteries or another portable energy source and is connected with a recorder for direct recording of images on tape, the camera operator must carry out all white and black level adjustments. This is an additional chore which should be simplified as much as possible, especially since the operator normally does not carry along an oscilloscope and also because he is mainly concerned with the artistic aspect of the picture taking.

The selector 9 and knob 10 on the main housing 1 of our camera enable the operator to complete the black and/or white level adjustment with minimum loss in time, for example, between the shooting of two successive scenes. The level adjustment itself is fully automatic; all the operator has to do is to select the position of the member 9 and to thereupon depress the pushbutton 10. The black level adjustment must be preceded by an actuation of the knob 32 in order to move the disk 31 to the light-obstructing position 31'.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. In a television camera, particularly in a portable color television camera, a combination comprising a first housing; a picture taking lens mounted on said first housing; a second housing connected to said first housing; view finder means mounted in said second housing; and a pair of electroacoustic transducers for enabling the operator to communicate with a control center, one of said transducers being mounted in said first housing and the other of said transducers being mounted in said second housing.

2. A combination as defined in claim 1, wherein said one transducer is a loudspeaker and said other transducer is a microphone.

3. A combination as defined in claim 2, wherein said loudspeaker is mounted at an opening of a wall of said first housing and said view finder and microphone being mounted in a wall of said second housing extending transverse to said wall of said first housing.

4. A combination as defined in claim 3, wherein said second housing is connected to said first housing adjustable in a direction toward and away from and tiltable about an axis transverse to said wall of said first housing.

5. A combination as defined in claim 1, further comprising coupling means separably connecting said housings to each other.

6. A combination as defined in claim 5, further comprising electrical conductor means connecting said view finder means with said first mentioned housing, said conductor means including mating but separable male and female portions provided in said coupling means.

7. A combination as defined in claim 6, wherein said male and female portions respectively include a plug and a socket.

8. A combination as defined in claim 5, wherein said coupling means includes a crank arm having a first and a second end portion, means for separably securing said first end portion to said first mentioned housing, and means for separably connecting said second end portion to said second housing.

9. A combination as defined in claim 8, wherein said first end portion is hollow and said means for separably securing said first end portion to said first mentioned housing comprises a sleeve telescoped into said first end portion.

10. A combination as defined in claim 9, wherein said means for separably securing said first end portion to said first mentioned housing further comprises fastener means for clamping said first end portion to said sleeve.

11. A combination as defined in claim 8, wherein said second end portion includes a disk.

12. A combination as defined in claim 11, wherein said means for separably connecting said second end portion to said second housing comprises a second disk and connector means for maintaining said disks in abutment with each other.

13. A combination as defined in claim 12, wherein said disks are turnable relative to each other upon loosening of said connector means to thereby allow for changes in the position of said second housing relative to said first mentioned housing.

14. A combination as defined in claim 11, wherein said means for separably connecting said second end portion to said second housing comprises a second disk provided on said second housing and resilient means for biasing said disks against each other.

* * * * *